US012188718B2

(12) United States Patent
Hodges et al.

(10) Patent No.: US 12,188,718 B2
(45) Date of Patent: Jan. 7, 2025

(54) METHOD AND CONTROLLER FOR CONTROLLING A CONTINUOUS PROCESS

(71) Applicant: Woodside Energy Technologies Pty Ltd, Perth (AU)

(72) Inventors: Derek Hodges, Wembley Downs (AU); Philip West, Doubleview (AU)

(73) Assignee: Woodside Energy Technologies Pty Ltd, Perth (AU)

(*) Notice: Subject to any disclaimer, the term of this patent is extended or adjusted under 35 U.S.C. 154(b) by 572 days.

(21) Appl. No.: 15/809,009

(22) Filed: Nov. 10, 2017

(65) Prior Publication Data

US 2018/0128543 A1 May 10, 2018

(30) Foreign Application Priority Data

Nov. 10, 2016 (AU) .............................. 2016904593

(51) Int. Cl.
*F25J 1/00* (2006.01)
*F25J 1/02* (2006.01)
(Continued)

(52) U.S. Cl.
CPC ............ *F25J 1/0022* (2013.01); *F25J 1/004* (2013.01); *F25J 1/0052* (2013.01); *F25J 1/0055* (2013.01);
(Continued)

(58) Field of Classification Search
CPC ........ F25J 1/0214; F25J 1/0215; F25J 1/0216; F25J 1/0212; F25J 1/0249; F25J 1/0245;
(Continued)

(56) References Cited

U.S. PATENT DOCUMENTS 4,563,735 A * 1/1986 Hiroi .................... G05B 13/026
318/632
4,809,154 A * 2/1989 Newton ................. F25J 1/0241
700/28
(Continued)

FOREIGN PATENT DOCUMENTS

EP 0252455 B1 * 3/1993 ............. F25J 1/0245
EP 0529307 B1 * 2/1996 ............. F25J 1/0216
(Continued)

OTHER PUBLICATIONS

Australian Patent Office International-Type Search Report, AU2016904593, Mar. 2, 2017, 17 pages.

*Primary Examiner* — Frantz F Jules
*Assistant Examiner* — Webeshet Mengesha
(74) *Attorney, Agent, or Firm* — Edell, Shapiro & Finnan, LLC

(57) ABSTRACT

A method and controller compensates control variables of a continuous process prior to the control variables being input to the controller/control matrix to at least partially mask the effect of a selected disturbance or a manipulated variable on that controlled variable to the controller. The controlled variable(s) has been chosen to be an inference of a desired underlying or related variable which is not directly measurable. The selected disturbance to be masked is one which does affect the (measured) controlled variable, but not the underlying desired variable. By at least partially masking the effect to all intents and purposes the controller is unaware of the effect of the selected disturbance on the controlled variable and therefore, for a fully masked disturbance, does not make any adjustment to a manipulated variable associated with the selected disturbance which would unnecessarily alter the underlying desired variable. In the event of a partially masked disturbance there will be some modifica- (Continued)

tion of the manipulated variable in comparison to that which would occur in the absence of the method.

21 Claims, 7 Drawing Sheets

(51) Int. Cl.
G05B 1/03 (2006.01)
G05B 6/02 (2006.01)

(52) U.S. Cl.
CPC ........... *F25J 1/0072* (2013.01); *F25J 1/0082* (2013.01); *F25J 1/0087* (2013.01); *F25J 1/0214* (2013.01); *F25J 1/0216* (2013.01); *F25J 1/0244* (2013.01); *F25J 1/0252* (2013.01); *F25J 1/0257* (2013.01); *F25J 1/0292* (2013.01); *G05B 1/03* (2013.01); *G05B 6/02* (2013.01)

(58) Field of Classification Search
CPC .......... F25J 1/0252; F25J 1/0244; G05B 5/01; G05B 13/04; G05B 17/00; G05B 24/00; G05B 1/02; G05B 1/03
See application file for complete search history.

(56) References Cited

U.S. PATENT DOCUMENTS

| 7,946,127 | B2* | 5/2011 | Fountain | G05B 13/042 |
| | | | | 62/612 |
| 8,783,061 | B2* | 7/2014 | Coward | F25J 1/0087 |
| | | | | 62/612 |
| 2006/0100721 | A1* | 5/2006 | Piche | G05B 13/027 |
| | | | | 700/47 |
| 2009/0005886 | A1* | 1/2009 | Gao | G05B 5/01 |
| | | | | 700/29 |
| 2010/0011663 | A1* | 1/2010 | Coyle | F25J 1/0245 |
| | | | | 48/127.3 |
| 2011/0209494 | A1* | 9/2011 | Nelson | F01K 25/106 |
| | | | | 62/434 |

FOREIGN PATENT DOCUMENTS

| EP | 1921406 A1 | 11/2006 |
| WO | 2008103641 A3 | 8/2008 |
| WO | 2009051891 A1 | 4/2009 |

* cited by examiner

METHOD AND CONTROLLER FOR CONTROLLING A CONTINUOUS PROCESS

TECHNICAL FIELD

A method and controller are disclosed for controlling a continuous process. The disclosed method and controller may be used to control various continuous processes including, but not limited to, refrigeration in a mixed refrigerant loop in a LNG liquefaction plant.

BACKGROUND

The genesis of the disclosed method and controller has been the complex issue of controlling the constituents of a mixed refrigerant in an LNG liquefaction plant. In broad terms a LNG liquefaction plant has a main cryogenic heat exchanger (MCHE) in which a gas feed stream is liquefied by cooling to about −160° C. Cooling is achieved by heat exchanged with a mixed refrigerant which flows through a mixed refrigerant (MR) loop. The MR loop includes the MCHE, a mixed refrigerant compression stage and a MR accumulator. The mixed refrigerant is a combination of a light mixed refrigerant (LMR) and a heavy mixed refrigerant (HMR).

Following compression by the MR compression stage the compressed mixed refrigerant enters the MR accumulator. The MR accumulator comprises both liquid and vapour form of the compressed MR. The vapour phase of the MR is fed to a LMR circuit while the liquid phase of the MR is fed to a HMR circuit. Both the LMR circuit and the HMR circuit flow through the MCHE.

The mixed refrigerant inventory comprises a combination of refrigerants predominantly: methane ("C1"), ethane ("C2"), propane and heavier hydrocarbons ("C3+") and nitrogen ("N2").

One method of controlling the mixed refrigerant is on a "composition and inventory" basis in which calculations are performed to estimate the total mass of the individual components within the entire MR loop and to then hold that constant by adding or purging refrigerant components.

This requires very complex calculations as it is necessary to determine the composition of both the HMR and LMR (by performing a flash calculation on the measured analyser composition at the temperature and pressure of the MR accumulator) and to examine the behaviour of the MR within different sections of the process piping and vessels. Variations in liquid (HMR) inventory manifest as a level change in the MR accumulator. Variations in vapour (LMR) inventory manifest as pressure changes in the LMR pipework. These can both be measured on-line.

The inventory is analysed considering the system to have some sections of constant volume (e.g. permanently liquid full) and some variable sections (e.g. liquid level in a vessel). For the vapour phases all sections were considered variable due to pressure variations. Estimates are made for all sections at typical conditions and added together. This is used to generate a base (reference) inventory point, considered as "100% of desired inventory". Addition or removal of any components would result in measurable variation in the variable sections of the MR loop and this would then translate into movement in the "% of desired", which became one of the control variables "CVs".

The inventories of the separate components are estimated using the estimated inventories and the mass compositions of the separate phases. This allows an overall "pool composition" to be calculated. This result, which in fact does not physically exist anywhere in the system, could be considered the result of the hypothetical case of removing all the MR from the system, vaporising it and then measuring the resultant composition as (mass) percentages of the N2/C1/C2/C3+ components.

From this, model-based control could adjust the flows of the appropriate make-up streams (or purges) to maintain the "inventory" and the separate component pool composition percentages.

This approach suffers from several drawbacks.

Addition or removal of a component does not instantly affect the entire MR circuit, or even the analyser. Being a gas chromatograph the analyser typically has an 8-10 minute response time. The MR circuit also takes 15-30 minutes for compositional changes to equilibrate throughout the circuit. Hence even though calculations are performed every minute, it is necessary to provide a significant filter to smooth the results of the calculations to reduce meaningless noise associated with misaligned measurements. This results in a delay in response to any unmeasured disturbance.

The piping and vessel volumes of the different sections (liquid, vapour or two-phase) are not known exactly. Errors in the assumed system volumes directly translate into errors in the change of component percentage of desired inventory. Errors in the split between liquid, vapour and two-phase inventory will also affect the individual component percentages, because each phase has a different composition. The MR inventory also has un-measured rate-dependent variable hold-up in the MCHEs and also but to a lesser degree in the compressors and propane (C3) coolers, and these are estimated from rate changes but introduce another source of error.

The "pool composition" does not directly relate to the parameters needed to optimise the MR loop and the MCHE operation in particular, especially since the pool composition is calculated with mass (not molar) percentages. Hence it is not immediately obvious how to set or adjust targets for the pool composition based on observed behaviour at the MCHE and in the MR loop in general.

The response of this control system to diurnal variation in throughput is always somewhat compromised. In a typical gas-turbine driven LNG liquefaction facility or corresponding LNG train operating at maximum throughput, the production rate will vary continuously with ambient temperature changes because the turbine power varies. As noted above, rate changes alter the unmeasured hold-up of liquid MR in the MCHE. The HMR/LMR ratio is an optimisation variable for the LNG production process, but also affects the measured composition at the analyser and hence the composition and inventory calculations. Similarly, altering the compression ratio is also an optimisation variable, but this alters the component split between the LMR and HMR, even with no make-up or addition of components.

The calculation processes described above do work, but since they require reasonable filtering to smooth and stabilise the results, and since the actual pipe volumes are unknown, there is always some phase lag and error. This inevitably results in unnecessary and undesirable addition or removal of MR components, and a slow response to disturbances and hence poorer optimisation. Removal of MR components adds to operating costs as the removed components are usually flared and thus lost from the system.

Also that addition or removal of any component streams will affect all the component percentages (by dilution). This results in a 100% dense control matrix where every component composition behaves as an integrator (rather than a steady-state variable) with respect to changes in the make-up flows. The problem is further compounded because process changes associated with diurnal variation or other adjustments (such as LMR/HMR ratio) will result in components moving between the HMR and LMR phases (complicating the inventory calculations) and also inventory moving between the phases—even if nothing is being added or subtracted from the system.

The model-based control thus utilises: as control variables the percentage of C1, C2, C3+ and N2 mixed refrigerant pool; and as manipulation variables the volumes of C1, C2, C3+ and N2. Other external factors which affect the control variables such as diurnal temperature variations and rate hold-ups are often referred to as disturbances or disturbance variables. The general principle of the model-based control is that one or more control variables which relates to a characteristic of the process or process stream which results from the process is measured and compared to a set-point or reference. The deviation between the controlled variable and the set-point is fed into a controller (or a control matrix of the controller). The controller then determines on the basis of the control matrix the appropriate control of a manipulated variable to affect the process so that the deviation between the controlled variable and the set-point is minimised.

Another method for controlling a process is to use active disturbance rejection control (ADRC) such as for example as described in WO 2009051891. This method seeks to reject both unknown and internal dynamics of a system, and external disturbances without needing a detailed knowledge of the plant dynamics. The only information required to configure an ADRC is knowledge of the relative order of the plant and its high frequency gain. The ARDC for a $n^{th}$ order system proposes a $n^{th}$ order output which is the sum of: (a) a generalised disturbance being a mathematic function having as inputs: the system output, its first to (n−1)th derivatives and the external input disturbance; and (b) the product of the control system and a constant. The ARDC controller then relies on an extended state observer (ESO) which is a mathematical model designed to estimate the effect of most plant dynamics and external disturbances into a single quantity along with its derivatives.

Such a method thus relies upon the design of an extended state observer that closely estimates the plant output, its first to n−1 derivatives and the mathematical function which is treated as a generalised disturbance using the first to n−1 derivatives, where "n" is the order of the plant. In short ARDC proposes to cancel the generalised disturbance (i.e. the external disturbances and unknown internal dynamics) using the output of the ESO to reduce the plant, from a control aspect, to a unity gain, $n^{th}$ integral plant that can be easily controlled with linear proportional derivative with feed-forward. But the underlying premise of the process in WO 2009051891 is that the measured variable is the desired variable to be controlled, and hence that the desired variable can in fact be measured (in order to create and observe the error signal), which as described above cannot be achieved via direct measurement in many processes for example for the case of the mixed refrigerant control. Although generalizable to any measurable system, the examples quoted are for robotic arm motion and related applications, which are of course directly measurable. The prior art does in fact describe the inherent difficulties associated with making and maintaining accurate mathematical models when linear time-invariant models are used to characterise non-linear time-varying systems such as the mixed refrigerant process, particularly when gain scheduling and similar techniques are applied.

The above reference to the prior art is not intended to limit the application of the method and controller as disclosed herein. In particular while mixed refrigerant control within a LNG liquefaction plant and corresponding LNG train provides background context and one example of a field of application, the disclosed method and controller have application to process control in general and may be used in relation to other specific processes.

SUMMARY OF THE DISCLOSURE

In broad and general terms the idea of the disclosed method and controller is to compensate the control variables prior to them being input to the controller/control matrix to at least partially mask the effect of a selected disturbance or manipulated variable on that controlled variable to the controller. The controlled variable(s) has been chosen to be an inference of a desired underlying or related variable which is not directly measurable. The selected disturbance to be masked is one which does affect the (measured) controlled variable, but not the underlying desired variable. Thus by at least partially masking the effect to all intents and purposes the controller is unaware of the effect of the selected disturbance on the controlled variable and therefore, for a fully masked disturbance, does not make any adjustment to a manipulated variable associated with the selected disturbance which would unnecessarily alter the underlying desired variable. In the event of a partially masked disturbance there will be some modification of the manipulated variable in comparison to that which would occur in the absence of the proposed method. This modification would be one of partially reducing the adjustment of the manipulated variable in response to the partially masked disturbance.

In the disclosed method and controller one or more disturbance variable and/or manipulated variable is allowed to affect the process and/or the resultant process stream. Throughout this specification the term "independent variable" may also use to denote either: one or more disturbance variables; one or more manipulated variables; or as a collective term for both one or more disturbance variables and one or more manipulated variables. Thus in more generic terms the disclosed method and controller allows one or more independent variable to affect the process and/or the resultant process stream. But the method and controller is unable to see any effect (or at least only a part, but not the full, effect) of the independent variable on the controlled variable because the controlled variable is compensated prior to being input to the controller and associated control matrix. Therefore, in the case of seeing no effect on an independent variable, the method and controller makes no variation to a manipulated variable associated with the independent variable.

In one aspect there is disclosed a method of operating a controller of a continuous process the controller having: as inputs one or more measured control variables (CV) being indicative of a characteristic of the process or an associated process stream arising from the process; and as outputs, signals to vary one or more manipulated variables (MV) that affect the process; the method comprising: modifying the one or more CV prior to input to the controller to at least partially mask an effect of a disturbance on the process or the process stream such that the controller at least partially reduces its adjustment of an MV in response to that partially masked disturbance. The modifying of the one or more CV prior to input to the controller may be applied to some but not all of the disturbances.

In one embodiment the method comprises modifying the one or more CV prior to input to the controller to fully mask the effect of the disturbance wherein the controller makes no change to the MV in response to the effect of that disturbance on the process or process stream.

In one embodiment the modifying comprises:
allowing a disturbance to affect the process or the process stream, measuring the at least one CV subsequent to the effect of the disturbance and producing a compensated control variable CV' by adjusting the at least one measured CV to substantially cancel the effect of the disturbance on the at least one measured CV.

In one embodiment the disturbance comprises one or both of: a load on the process; and, a variation in the process or process stream arising from modification of a MV.

In one embodiment the process is a refrigerant control process in a mixed refrigerant (MR) loop of a LNG liquefaction plant the MR loop having a mixed refrigerant compression stage and a MR accumulator through which the mixed refrigerant flows and wherein the mixed refrigerant comprises a mixture of components in liquid phase, vapour phase or both liquid and vapour phases, the components including $N_2$, $C_1$, $C_2$, and $C_{3+}$; and
wherein the one or more CV comprise one or a combination two or more of:
(a) a molar percentage of $N_2$ in the MR at the high pressure end of the compression stage ("CV1");
(b) pressure in the MR accumulator ("CV2");
(c) a molar ratio $C_3/C_2$ at a high pressure end of the compression stage ("CV3"),
(d) liquid level within the MR accumulator ("CV4").

In one embodiment the disturbance is one or a plurality of disturbances.

In one embodiment one disturbance comprises a change in rate of the process.

In one embodiment another disturbance comprises a change in ambient temperature.

In one embodiment one or more of the control variables CV1-CV3 is compensated to produce corresponding compensated control variables CV1'-CV3' in which compensation is applied to mask the effect on the control variable CV1-CV3 of circulation through the MR loop.

In one embodiment the control variable CV4 is compensated to produce a compensated liquid level control variable CV4' and wherein one or both of CV4 and CV4' are used as inputs to the controller.

In one embodiment one of the manipulated variables MV1 is a flow rate of an $N_2$-rich stream added to or purged from the mixed refrigerant loop and wherein the controller is arranged to add or purge an $N_2$-rich stream to or from the mixed refrigerant when CV1' is outside of prescribed limits.

In one embodiment one manipulated variable (MV1) is a flow rate of an $N_2$-rich stream added to or purged from the mixed refrigerant loop and wherein the controller is arranged to purge or add $N_2$ to the mixed refrigerant when CV2' is outside of prescribed limits.

In one embodiment another manipulated variable (MV2) is a flow rate of a $C_1$ rich stream added to or purged from the mixed refrigerant loop and wherein the controller is arranged to purge or add $C_1$ to or from the mixed refrigerant loop when CV2' is outside of prescribed limits.

In one embodiment another of the manipulated variables (MV3) is a flow rate of a $C_2$ rich stream added to or purged from the mixed refrigerant loop and wherein the controller is arranged to add or purge the $C_2$ rich stream to or from the mixed refrigerant when CV3' is outside of prescribed limits.

In one embodiment the controller is arranged to add or purge a $C_2$ rich stream to or from the mixed refrigerant when CV4' is outside of prescribed limits.

In one embodiment one manipulated variable (MV3) is flow rate of a $C_2$ rich stream added to or purged from the mixed refrigerant loop and wherein the controller is arranged to or add or purge the $C_2$ rich stream to or from the mixed refrigerant when CV4' is outside of prescribed limits.

In one embodiment one of the manipulated variables (MV4) is a flow rate of a $C_3$ rich stream added to or purged from the mixed refrigerant loop and wherein the controller is arranged to purge or add the $C_3$ rich stream from or to the mixed refrigerant when CV3' is outside of prescribed limits.

In one embodiment another of the manipulated variables (MV3) is a flow rate of a $C_2$ rich steam added to or purged from the mixed refrigerant loop and wherein the controller is arranged to purge or add the $C_2$ rich stream from or to the mixed refrigerant when CV4' is outside of prescribed limits.

In one embodiment wherein another of the manipulated variables (MV4) is a flow rate of a $C_3$ rich steam added to or purged from the mixed refrigerant loop and wherein the controller is arranged to purge or add the $C_3$ rich stream from or to the mixed refrigerant when CV4' is outside of prescribed limits.

In a second aspect there is disclosed a method of controlling a mixed refrigerant (MR) loop in a LNG liquefaction plant, the MR loop having a main cryogenic heat exchanger (MCHE), a mixed refrigerant compression stage and a MR accumulator through which the mixed refrigerant flows, the mixed refrigerant comprising a mixture of components in liquid, vapour or both liquid and vapour phases, the components including $N_2$, $C_1$, $C_2$, and $C_{3+}$, the method comprising:
measuring liquid level within the MR accumulator;
measuring other characteristics of the mixed refrigerant at various points in the MR loop;
dynamically compensating the measured other characteristics that are subject to variation due solely to circulation of the MR through the MR loop;
using the compensated other characteristics and the actual measured liquid level as control variables in control matrix for an advanced process controller (APC);
arranging the APC to operate in accordance with the control matrix to add or purge one or more of the components to maintain the MR within prescribed parameters.

In one embodiment of the second aspect measuring other characteristics comprises measuring a molar ratio $C_3/C_2$ at a high pressure end of the compression stage.

In one embodiment of the second aspect measuring other characteristics comprises measuring a molar percentage of $N_2$ in the MR at a or the high pressure end of the compression stage.

In one embodiment of the second aspect measuring other characteristics comprises measuring pressure in the MR accumulator.

In one embodiment of the second aspect arranging the APC to operate in accordance with the control matrix comprises arranging the APC to add or purge one or both of a $N_2$ rich stream and a $C_1$ rich stream to maintain the MR within the prescribed parameters when the compensated pressure is outside of prescribed limits.

In one embodiment of the second aspect arranging the APC to operate in accordance with the control matrix comprises arranging the APC to add or purge a $N_2$ rich stream to maintain the MR within the prescribed parameters when the compensated molar percentage of $N_2$ is outside of prescribed limits.

In one embodiment of the second aspect arranging the APC to operate in accordance with the control matrix comprises arranging the APC to add or purge one or both of a C2 rich stream and a C3 rich stream to maintain the MR within the prescribed parameters when the compensated molar ratio of C3/C2 is outside of prescribed limits.

In one embodiment of the second aspect measuring arranging the APC to operate in accordance with the control matrix comprises arranging the APC to add or purge one or both of a C2 rich stream and a C3 rich stream to maintain the MR within the prescribed parameters when the measured liquid level within the MR accumulator is outside of prescribed limits.

In a third aspect there is disclosed a method of operating a controller of a continuous process, the controller being responsive to a control matrix, the control matrix having: as inputs one or more measured CV being indicative of a characteristic of the process or an associated process stream arising from the process; and as outputs, signals to the controller to vary one or more MV that affect the process; the method comprising:

modifying the one or more CV prior to input to the control matrix to mask from the control matrix at least a part of the effect of a disturbance on the process or the process stream such that the controller does not vary an MV in response to that disturbance.

In a fourth aspect there is disclosed a method of controlling a continuous process which results in a process stream, the process or the process stream being dependent on one or more independent variables, the process also having a process controller operable to vary one or more MVs dependent on at least one measured controlled variable CV which is indicative of a characteristic of the process or the process stream, the method comprising:

allowing selected independent variables to affect the process;

measuring the at least one CV subsequent to the effect of the selected independent variables;

modifying the at least one measured CV to compensate for the effect on the process or process stream of the selected independent variable to produce a modified control variable CV';

using the modified control variable CV' as an input to the controller wherein the applied compensation masks from the controller the effect of the selected independent variable on the CV.

BRIEF DESCRIPTIONS OF THE DRAWINGS

Notwithstanding any other forms which may fall within the scope of the method and controller as set forth in the Summary, specific embodiments will now be described, by way of example only, with reference to the covering drawings in which.

DETAILED DESCRIPTION

Figure 1:
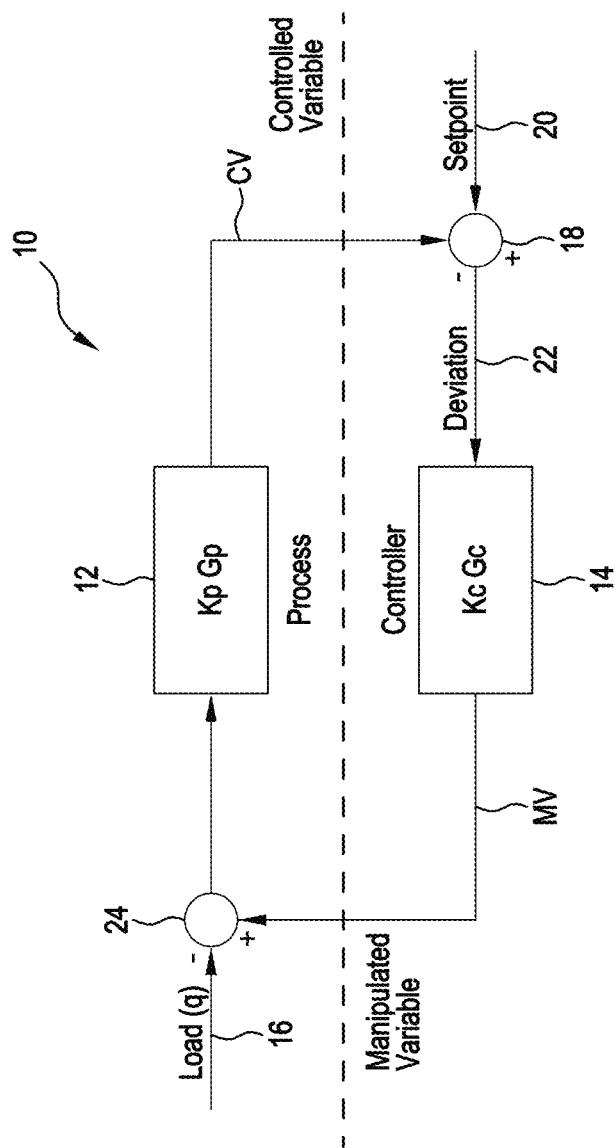
FIG. 1 is a block diagram illustrative of prior art classical control theory for controlling a dynamic process.

FIG. 1 illustrates a system 10 employing classical control theory for controlling a dynamic process 12. As an example the process 12 may be a flotation process for recovering a mineral. A desired result of the process 12 is the amount of mineral recovered in terms kilograms of mineral per hour. The system 10 includes a controller 14 which is associated with the process 12 or a process stream arising from the process 12. The controller 14 is arranged to control the process 12 so that the recovery of the mineral is at a desired level or at least within an acceptable range. The floatation process 12 is performed on a feed stream 16 which carries the mineral to be recovered. The feed stream 16 may be subject to various loads or disturbances such as fluctuations in feed stream pressure.

In order to control the process 12 the amount of mineral recovered is measured per unit time. This represents a controlled variable "CV" of the system 10. A comparator 18 compares the measured controlled variable CV with a reference level or range 20. This produces a deviation or error 22 which is provided as an input to the controller 14. The controller 14 has an embedded control algorithm or control matrix which determines the controller's response to the deviation or error 22. In this example the controller is arranged to control the position of a valve 24 in response to the load or disturbance on the feed stream 16. The position of valve 24 is a manipulated variable "MV" of the system 10.

Thus in the system 10 any disturbance or load on the feed stream 16 which has an effect on the CV is seen by the controller 14 by virtue of the deviation 22 and subsequently acted upon by the controller 14 to control the MV in response to the disturbance with the ultimate aim of reducing the deviation or error to or close zero.

Figure 2:
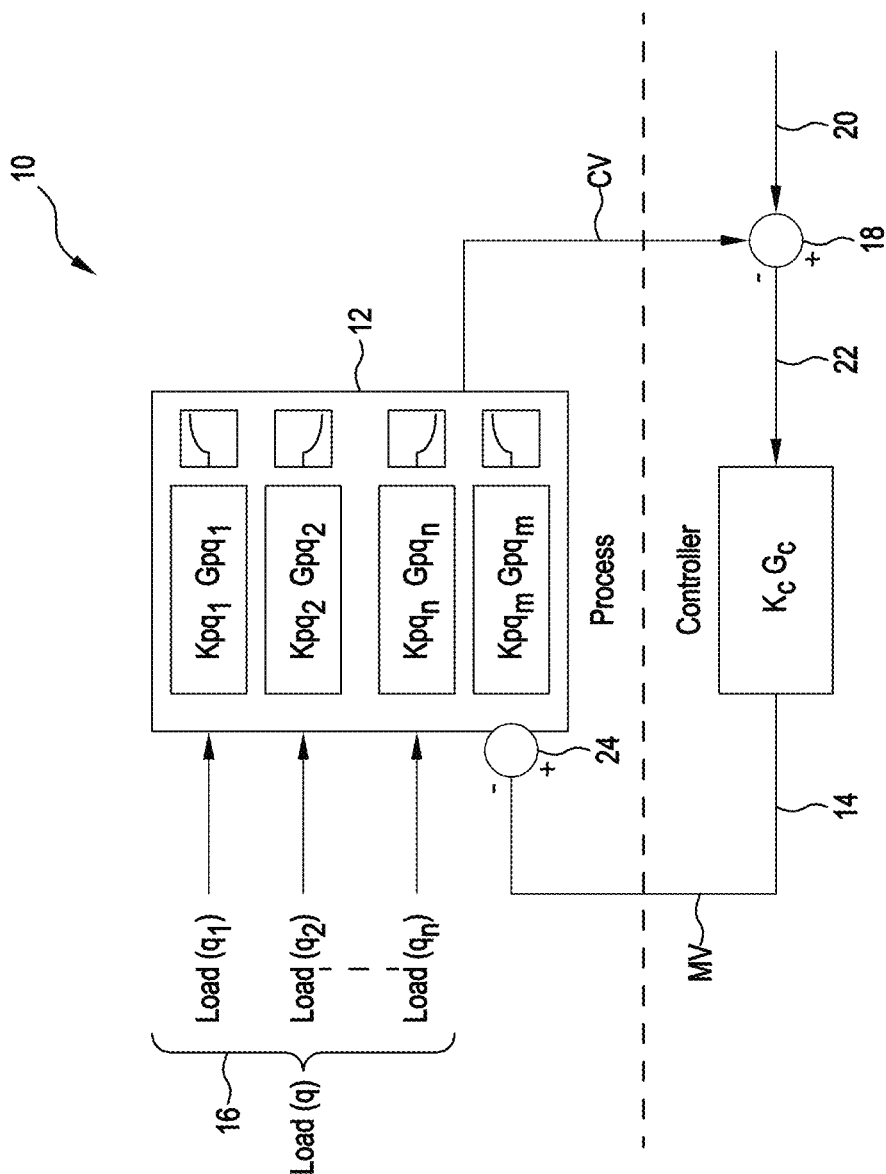
FIG. 2 is a more detailed block diagram illustrative of the prior art classical control theory shown in FIG. 1 showing separate dynamic responses associated with separate individually measurable components of the load on the process.

FIG. 2 illustrates the same system 10 as shown in FIG. 1 but with the process 12 separated into individual dynamic responses associated with separate individually measurable components of the overall load/disturbances. For example load:

q1 may be feed stream pressure
q2 may be feed stream temperature
qn may be feed stream pH The response of the process 12 or the characteristics of the associated process stream vary in different ways to the different disturbances. This is illustrated in FIG. 2 both mathematically and graphically mathematically for each load. In mathematical terms the response to process 12 to a variation in the load q1 is:

Kpq1Gpq1
Where:
Kp is steady-state gain of the process,
Gp is dynamic gain of the process consisting of a scale gain and a phase angle Graphically this is represented by a curve having an initial horizontal portion representing dead time, i.e. a lag between a variation in the load and the response to that variation on the process, followed by a steady-state response to a new point after the load which then settles to that new point.

One or more CVs are measured at the output of the process 12. While FIG. 2 shows only a single CV being used to provide an input to the controller 14, multiple CVs can and commonly are used to provide inputs to the controller 14. For example in this it instance there may be two CVs: kg/h of recovered mineral; and, purity of the recovered mineral.

The CVs are compared at comparator 18 with respective set-points (being either a desired level or a range for the CV) to produce corresponding deviations or errors. These are then provided to the controller 14 which on the basis of an embedded algorithm or control matrix affects one or more MVs for a purpose of reducing the deviations or errors to or close to zero. While only one MV is represented in FIG. 2 multiple MV's may be used, and indeed multiple MV's may be used in relation to any one CV. In the present example of the floatation process 12 MV's may include, but are not limited to: feed stream pressure, feed stream flow rate, flow rate of an acid into the feed stream, flow rate of a base into the feed stream, flow rate of a catalyst into a flotation cell.

As with the loads q1-qn the process 12 is of course responsive to the MV's. Indeed this is the entire purpose of the MV's. In FIG. 2 the response of the process 12 to the MV's is illustrated mathematically and graphically in the same manner as that in relation to the load q. The load/disturbance is also often referred to in the art as a disturbance variable DV. Hereinafter the expression "disturbance variable" or the acronym "DV" is used to denote a load or disturbance on a process. The expression "independent variable" or corresponding acronym "IV" is used in the art as a generic or general expression which encompasses both DV's and MV's.

Thus in summary and in general terms where the system 10 is controlled in accordance with classical control theory the effect on the process of one or more IV's is ascertained by measuring one or more CVs which are characteristics of the process, or the process stream, and subsequently adjusting one or more MV's such that CVs are maintained at a set point (i.e. a specified level or within a predetermined range).

Figure 3:
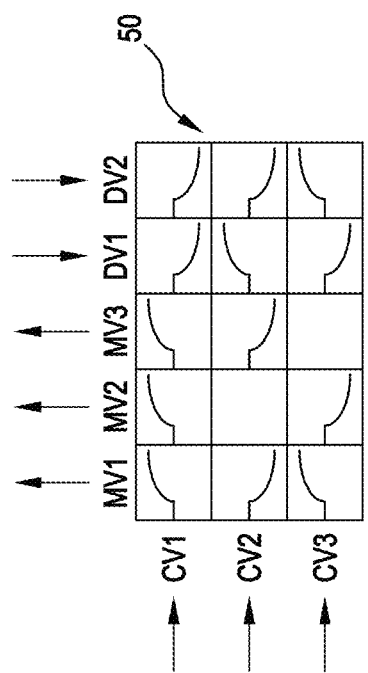
FIG. 3 is a schematic representation of a control matrix for a controller operating under the prior art classical control theory.

FIG. 3 shows a control matrix 50 employed by the controller 14 for performing the system and method 10. The matrix 50 shows the cause and effect relationship (steady-state gain plus dynamic gain) between the independent variables (MVs, and DVs) and the controlled variables CVs. In this instance there are three controlled CV1, CV2, and CV3; two disturbance variables DV1 and DV2; and three manipulated variables MV1, MV2 and MV3. The matrix 50 shows that the controlled variables CV1-CV3 are controlled to set-points or ranges by one or more of the MVs as part of the control algorithm. Disturbances introduced to the controlled variables CV1-CV3 by one or more of the DVs are also compensated for by moves in one or more of the MVs to maintain the CVs at a set point or within a prescribed range.

In the depicted control matrix 50 movement of the manipulated variable MV2 can be used to maintain CV1 and CV3 at a set point but has no effect on the controlled variable CV2, as indicated by the absence of a dynamic process response model in the box at the matrix location CV2/MV2.

Figure 4:
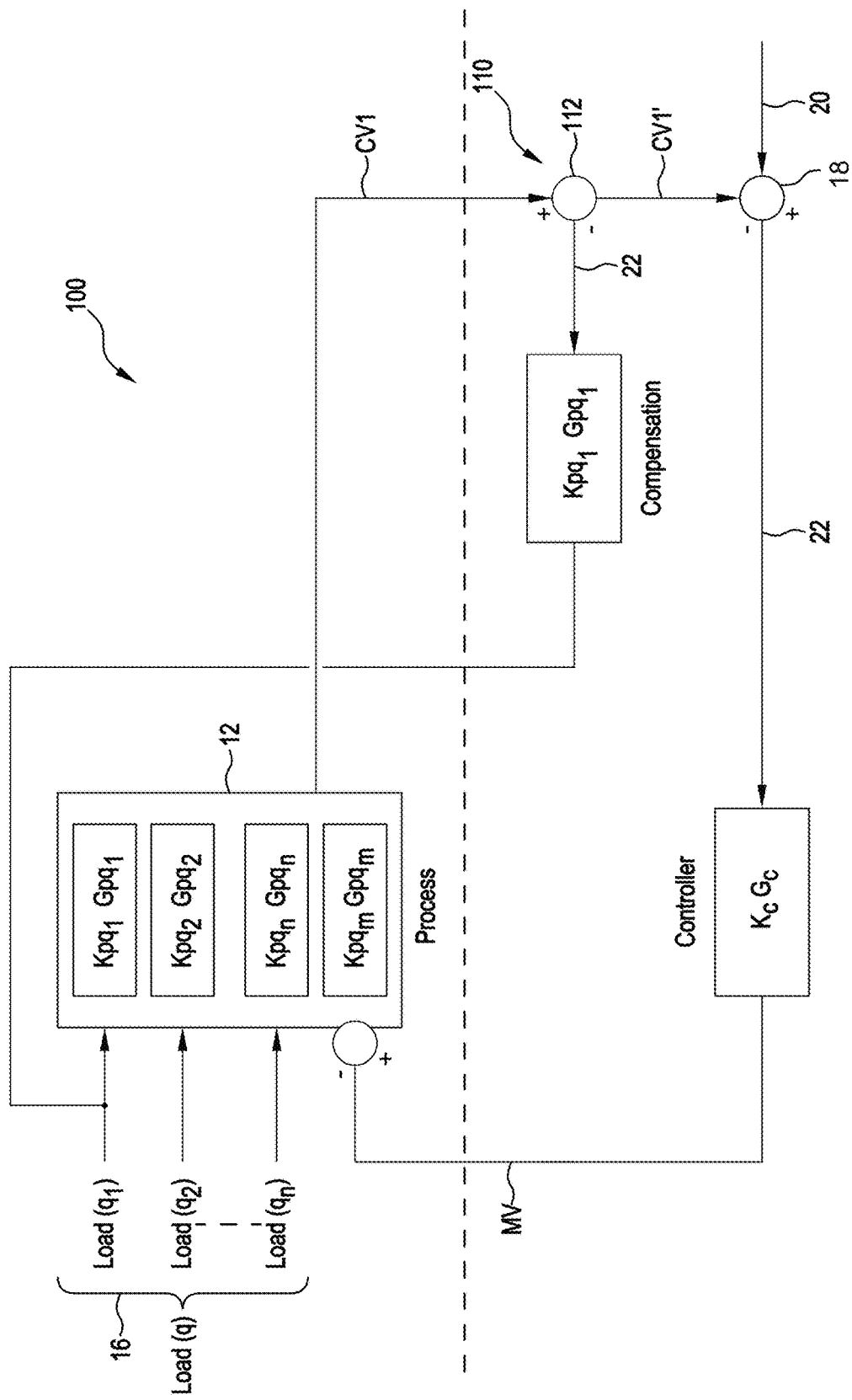
FIG. 4 is a block diagram illustrative of the disclosed system and method for controlling a dynamic process.

FIG. 4 depicts an embodiment of the disclosed system and method 100 in which the same reference numbers are used to know the same or similar features as those shown in FIG. 2. As is readily apparent from a comparison between FIGS. 2 and 3 the disclosed method and system 100 differs from the prior art system and method 10 by applying compensation to a CV to subtract the effect of an independent variable IV, which usually but not always, is a DV. To this end the method 100 includes a compensation or modification step 110 where the effect of a selected IV, in this case load q1, on process 12 is removed from a controlled variable CV1. This is represented in FIG. 4 by subtracting the output of function (Kpq1 Gpq1) from CV1 in comparator 112. This results in a modified/compensated control variable CV1'. It is the modified control variable CV1' that is compared at the comparator 18 with the corresponding set-point to generate the deviation or error 22.

Ideally the compensation applied will fully compensate for the effect of the selected IV on CV1. As a consequence the error or deviation 22 input to the controller 14 would be the same as if the disturbance never occurred. That is, the compensation step 112 modifies CV1 prior to input into the controller 14 to effectively mask the effect of the selected IV on the process 12 so that the controller does not make an adjustment of the MV's associated with the effect of the selected IV. In some circumstances and processes it may be possible to modify a CV prior to input to the controller to fully mask the disturbance. However in many cases when attempting to fully mask the effect of a disturbance, due to imperfections in physical systems and acceptable measurement tolerances, in practice the masking effect may not be complete, for example 95%-98% masking may be achieved. It is further contemplated however that the system and method 100 may be operated to intentionally only partially mask the effect of an IV (i.e. a DV or a MV).

It is important to recognise that application of the disclosed system and method 100 does not in any way prevent the IV from affecting the process 12. Accordingly the disclosed system and method 100 allows a designated CV to vary. The system and method 100 however is able to selectively partially or substantially fully mask the effect of an IV on a CV so that the controller 14 does not make any adjustment of a particular MV in response to movement of or variations in that CV.

Figure 5:
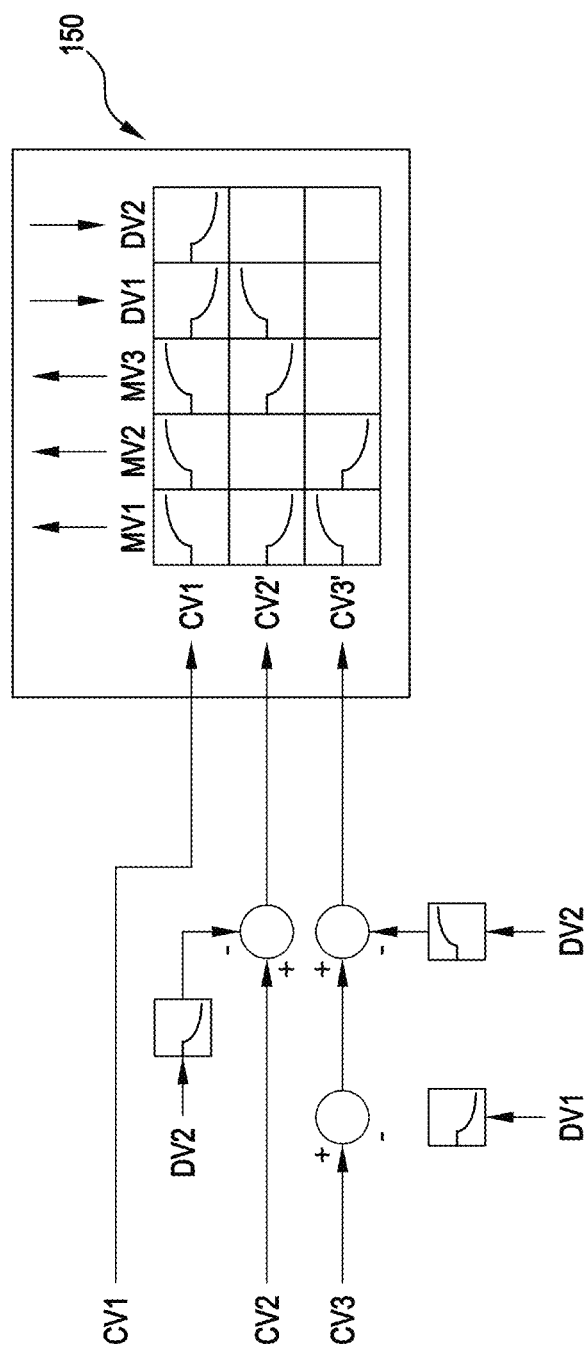
FIG. 5 is a schematic representation of a control matrix for a controller utilising the disclosed system and method for controlling a dynamic process.

FIG. 5 illustrates an example of control matrix 150 incorporated in the controller 14 of the disclosed system and method 100 shown in FIG. 4. Using the prior art or standard control matrix 50 shown in FIG. 3 as a base, the control matrix 150 incorporated in embodiments of the present system and method 100 is amended or modified to remove the real effect of one or more of the independent variables (i.e. the disturbance variables or manipulated variables) on one or more of the controlled variables. Specifically in this example the effect of the disturbance DV1 on the controlled variable CV3 is removed as indicated by the empty box at the corresponding matrix location; and the effect of the disturbance DV2 on the controlled variables CV2 and CV3 is removed as indicated by the empty boxes at the corresponding matrix locations.

In addition the effects of the disturbance DVs are first subtracted from the original controlled variable CVs creating the modified control variable CVs' before those variables are seen or otherwise acted upon by the controller 14 and control matrix 150.

In this case, the controller 14 which operates in accordance with the control matrix 150 would not need to make a move to counter a move in CV2' or CV3' if DV2 moves. CV2 and CV3 will both move, but the corresponding modified controlled variables CV2' and CV3' are maintained at the same value as the corresponding controlled variables CV2 and CV3 would have been had the disturbance DV2 not occurred. Hence the controller 14 will not apply any compensating moves associated with a move of DV2 with respect to CV2 and CV3. Moves to maintain CV1 would still be required. Similarly, the controller 14 would make no move to counter a move in the controlled variable CV3 if there is a change arising from the effect of the disturbance DV1.

Figure 6:
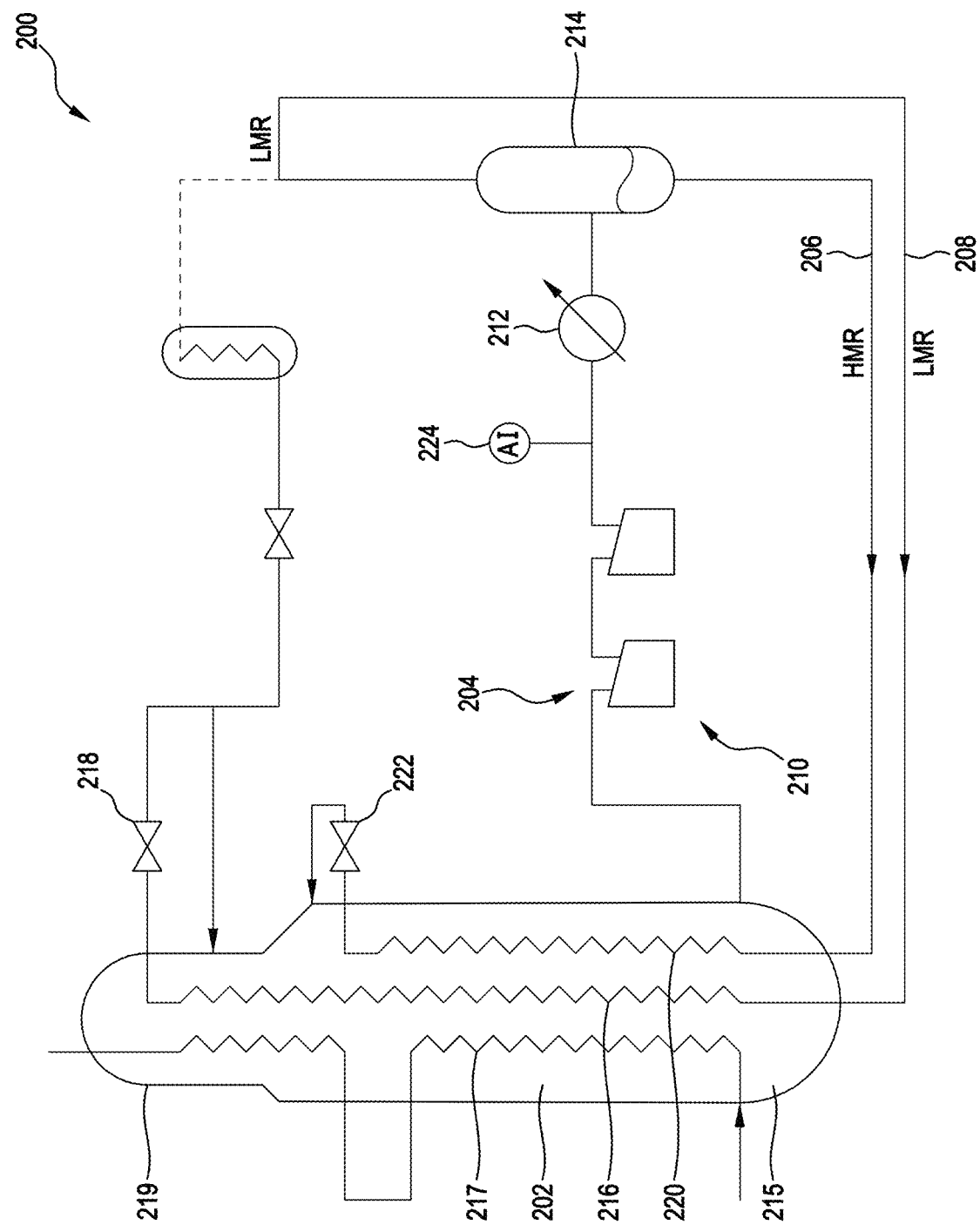
FIG. 6 is a schematic representation of a LNG liquefaction plant having a mixed refrigerant loop in relation to which embodiments of the disclosed system and method may be applied.

An embodiment of the system and method 100 will now be described with reference to the control of refrigerant inventory in a mixed refrigerant (MR) loop 200 of a LNG liquefaction plant shown in FIG. 6. The MR loop 200 includes a main cryogenic heat exchanger (MCHE) 202, a mixed refrigerant (MR) circuit 204, a heavy mixed refrigerant (HMR) circuit 206 and a light mixed refrigerant the (LMR) circuit 208. An outer body or shell of the MCHE 202 forms a shell side circuit. The MR circuit 204 comprises a compression stage 210 which compresses a mixed refrigerant received from the shell side circuit of the main cryogenic heat exchanger. The compressed mixed refrigerant is cooled by propane cooler 212 and supplied to a mixed refrigerant accumulator 214. The cooled compressed mixed refrigerant separates in the mixed refrigerant accumulator 214 into a vapour phase and a liquid phase. Natural gas flows enters at a warm end 215 of the MCHE 202, flows through a tube side circuit 217 and leaves at a cold end 219 as a sub cooled liquefied stream.

The vapour phase forms the light mixed refrigerant and flows through the LMR circuit 208 which includes a tube side circuit 216 passing through the MCHE shell. The light mixed refrigerant passes through an expansion device 218 and enters the shell side circuit in which it is evaporated before being removed as a gas at a suction side of the MR compression stage 210.

The liquid phase which forms the heavy mixed refrigerant flows through the HMR circuit 206 which includes a tube side circuit 220 running through the MHCE shell. The heavy mixed refrigerant is expanded through an expansion device 222 and enters the shell side circuit at an intermediate location. The heavy mixed refrigerant is also evaporated as it flows through the shell side circuit before being removed as a gas at the suction side of the MR compression stage 210.

As mentioned in the discussion of the background art the mixed refrigerant inventory which circulates through the MR loop 200 primarily comprises: methane "C1", ethane "C2" propane "C3" and heavier hydrocarbons "C3+" and nitrogen "N2". The pressure, temperature and ratio of various components of the mixed refrigerant vary at different points in the MR loop 200. Additionally the phase of the different components of the mixed refrigerant will change depending on the pressure and temperature conditions at various points in the MR loop 200. The level of the liquid phase of the mixed refrigerant within the mixed refrigerant accumulator 214 will vary with changes in inlet temperature, pressure within the accumulator 214, and production rate. The pressure in the MR accumulator 214 will change with inlet pressure, production rate and the LMR/HMR flow ratio. It is desirable to maintain the level of the liquid phase (i.e. the heavy mixed refrigerant) in the MR accumulator 214 within a specified range. The proportion of the components in the mixed refrigerant may be measured by an analyser 224 at the high pressure end of the MR compression stage 210. The analyser 224 may be in the form of a gas chromatograph. There is typically a lag time of about 10-15 minutes between the analyser 224 taking a sample of the mixed refrigerant and providing a measure of the content of each component in the mixed refrigerant.

In applying an embodiment of the system and method 100 to the mixed refrigerant loop 200 the controlled variables are selected as one or a combination of two or more of:
 (a) a molar percentage of N2 in the MR at the high pressure end of the compression stage 210 ("CV1");
 (b) pressure in the MR accumulator 214 ("CV2");
 (c) a molar ratio C3/C2 at a high pressure end of the MR compression stage 210 ("CV3"),
 (d) liquid level within the MR accumulator ("CV4").

While the MR loop 200 is subjected to many disturbances, for the sake of simplicity and for the purposes of providing an example only an embodiment of the disclosed system and method 100 is described with reference to two possible disturbances DV1(LMR/HMR ratio) and DV2 (production rate). Other possible DVs in the MR loop 200 would for example include those related to "sloshing" of the MR in various parts of the MR the loop which do not affect the overall MR composition but can produce an appearance of variation from a set-point or reference level.

Figure 7:
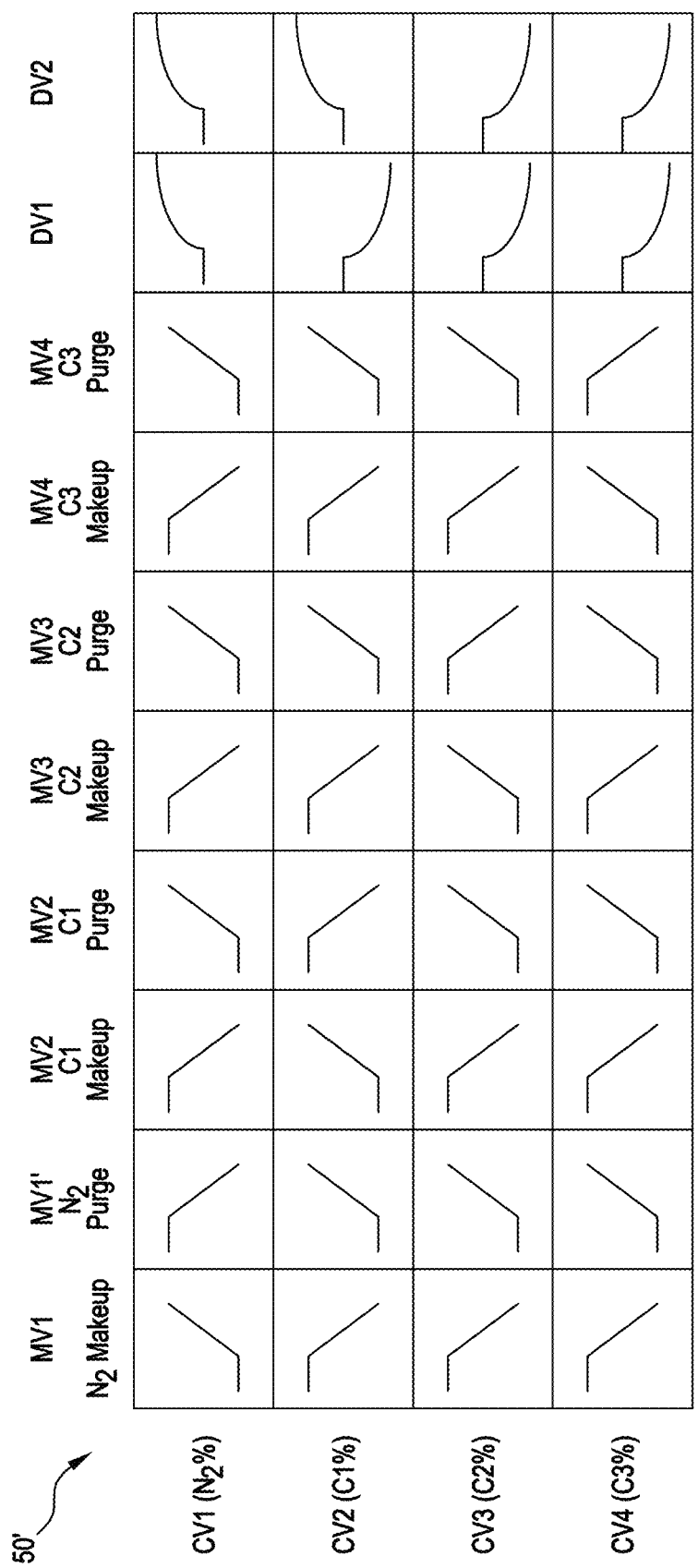
FIG. 7 is a schematic representation of a control matrix for a mixed refrigerant loop of a LNG liquefaction plant utilising prior art classical control theory.

Similarly there are many manipulated variables MVs the may be incorporated in various embodiments of the system and method 100 as applied to the MR loop 200. Examples of the manipulated variables include, but are not limited to:
 the make-up flow rate of a N2-rich stream,
 the make-up flow rate of a C1-rich stream
 the make-up flow rate of a C2-rich stream into the MR loop 200 at a first location
 the make-up flow rate of a C2-rich stream into the MR loop 200 at a second location
 the make-up flow rate of a C3-rich stream
 the purge/vent rate of a N2-rich stream
 the purge/vent rate of a C1-rich stream from a first location in the MR loop 200
 the purge/vent rate of a C1-rich stream from a second location in the MR loop 200
 the purge/vent rate of a C2-rich stream
 the purge/vent rate of a C3-rich stream FIG. 7 shows a very simplified example of control matrix 50' for a prior art controller of a MR loop in an LNG liquefaction plant. Here the control variables CV1-CV4 are simply the percent of N2, C1, C2, and C3+ respectively in the MR inventory. For simplicity only four manipulated variables MV1-MV4 are shown, these being the make-up or purge rates of N2-rich, C1-rich, C2-rich, and C3-rich streams respectively. (The locations of these streams would be well known to an experienced practitioner of the art.) Two disturbance variables DV1 and DV2 are shown.

In FIG. 7 each of the MVs is shown as two alternatives, namely a make-up or a purge. It will be understood by those skilled in the art that a MV in relation to any specific variable will be a make-up, a purge or of course "no change". The "no change" is not shown as this is manifested by the deviation determined at comparator 18 and the set point being zero. FIG. 7 is intended to depict that at any particular instant a specific MV will be in either a make-up, purge or "no-change" mode and not that a specific MV will be simultaneously in both make-up and purge mode in response to the same CV. This is a 100% dense matrix in which every MV and DV can have an effect on every CV.

Figure 8:
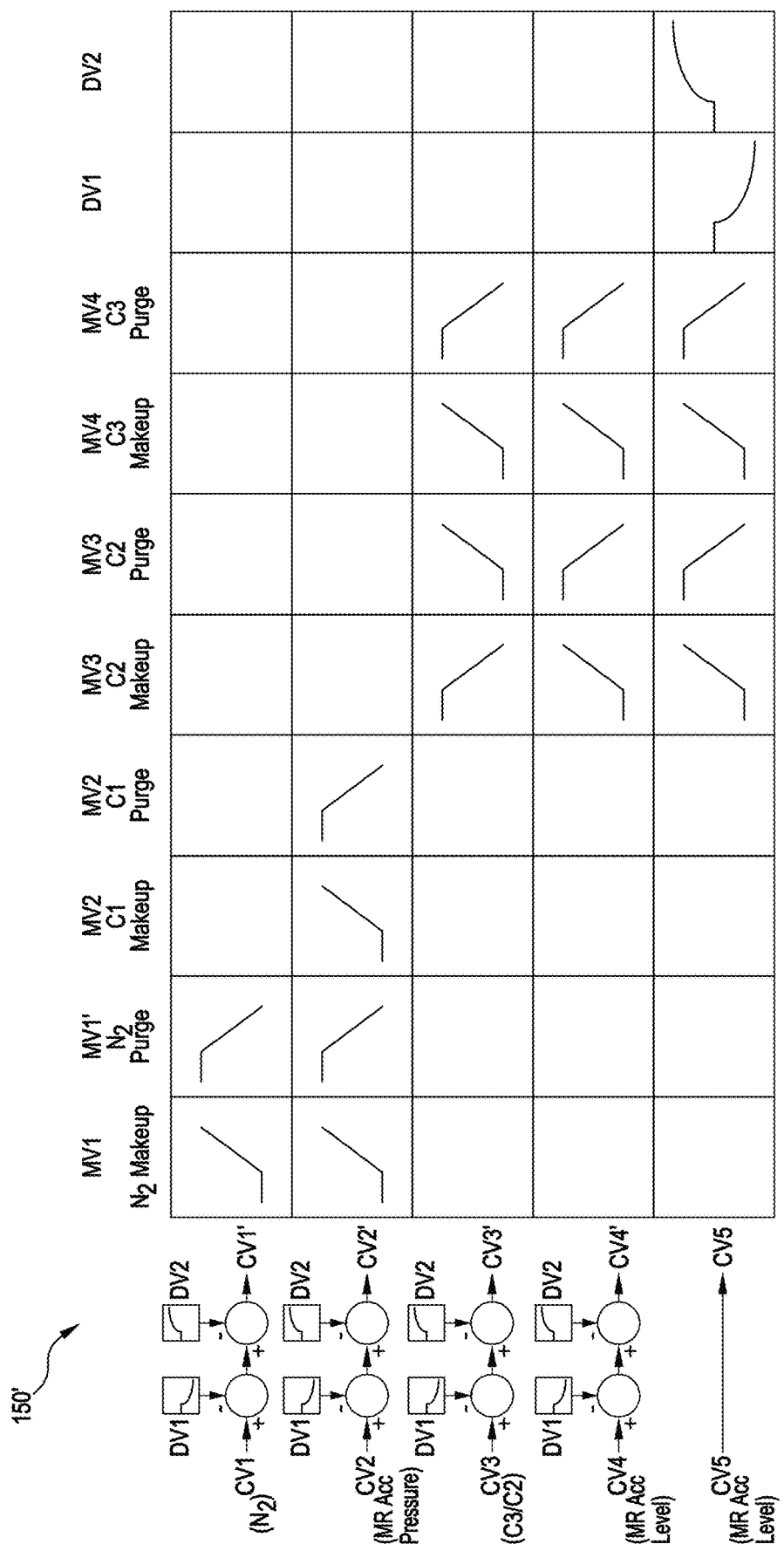
FIG. 8 is a schematic representation of a control matrix for a mixed refrigerant loop of a LNG liquefaction plant utilising the disclosed system and method for controlling a dynamic process.

FIG. 8 in contrast shows a simplified control matrix 150' that may be utilised in an embodiment of the disclosed method and system 100 for controlling refrigerant in a MR loop 200 of an LNG liquefaction plant. It will be seen that the matrix of FIG. 8 is not 100% dense. This graphically illustrates an advantage or benefit of the embodiments of the disclosed method and system in simplifying the overall automated control of a dynamic continuous process in which the effect of various disturbances while being allowed to affect the process are negated in terms of their effect on the output of the controller 14. In this way it is possible to mask the effect of user selectable disturbances. This is particularly beneficial when it is known that various disturbances while giving an appearance of requiring remedial action can be disregarded. An example of this in the MR loop 200 is the effect of "slosh" of the refrigerant on the liquid level in the MR accumulator 214 ("slosh" being a variation in level associated with migration of MR inventory between the MCHE and the accumulator, but not moving into or out of the circuit.)

As per FIG. 7, each of the MVs in FIG. 8 is shown as two alternatives, namely a make-up or a purge, with the "no-change" not specifically represented as it arises form a zero deviation at the comparator 18.

The controlled variables CV in this embodiment are as mentioned above:
(a) a molar percentage of N2 in the MR at the high pressure end of the compression stage 210 ("CV1");
(b) pressure in the MR accumulator 214 ("CV2");
(c) a molar ratio C3/C2 at a high pressure end of the MR compression stage 210 ("CV3"),
(d) liquid level within the MR accumulator ("CV4").

However the controlled variable CV4 is in this example provided in both a non-compensated and compensated form. This arises due to the critical nature of the liquid level within the MR accumulator 214. The compensated controlled variable CV4' is always applied to the control matrix and accordingly results in the masking variations in liquid level that would normally arise through variations in the circulation of the refrigerant through the MR loop 200 from the controller. However in extreme situations where the uncompensated level movements are sufficiently large the uncompensated level CV5 may be selected as the appropriate input to the control matrix 150' so that the controller generates an appropriate response via one or more of the manipulated variables.

Notwithstanding the above description of the prior art and specific embodiments of the disclosed system and method, in order to aid the reader in understanding differences between: the disclosed method and system; and, conventional prior art control techniques, a further example is provided.

Consider in a vehicle travelling along a road a vessel containing a liquid level which is to be maintained at a desired inventory. Several streams can be independently drawn from the vessel. The liquid level is measured and used to adjust a make-up and purge valve. These valves are controlled to add or purge liquid to or from the vessel and thus maintain the liquid level. This is classic feedback control (shown in FIG. 1) and key to this is the underlying assumption that maintaining the level also maintains the desired inventory.

The liquid level in the vessel is subject to various disturbances. As the car travels along the road, bumps in the road will create ripples in the level signal. These can be reduced by filtering the level signal before the controller acts on it which is a standard practice. The filter constant is adjusted to best suit the frequency of the disturbance, and could be tuned to e.g. pot-holes, but might not work as well when the vehicle traverses speed humps.

As the demand flows drawn from the vessel vary, it is possible to measure these changes in out-flow and have an additional controller see this independently of the level signal and directly adjust the in-flow (make-up) in parallel with the feedback control before the level changes—this is classical feed-forward/feed-back control, also standard practice and prior art.

Unless the vessel is supported by some sort of gimbal arrangement, as the vehicle goes up and down hills the vessel will tilt forward or backward relative to horizontal, and this has the capacity to alter the level reading, depending on the geometry. However if the sense point is located at the centre of rotation (pitch) then the level will not be affected—this disturbance is "designed out" by the hardware—again a standard practice where possible. This would also compensate for (reject) effects of acceleration or deceleration in a straight line.

But consider the case where the vehicle is travelling around a large traffic circle (roundabout). In this case the acceleration will result in a sustained level change as inertia forces liquid to one side. In this case it is not desirable to reduce the make-up or purge because once the vehicle continues in a straight line the inertial effects will vanish and the level will suddenly be too low. Embodiments of the disclosed method and system would create a new signal which when added to the "raw" level signal would cancel out the change in level associated with the inertial forces. The feedback controller would have no need to act on this disturbance and would not alter the make-up. The real change in level is allowed to happen but ignored for the duration of the measured disturbance because the underlying inferred variable (the inventory in the vessel) is in fact unchanged.

This is distinctly different from prior art which is concerned with sophisticated ways of ensuring a (raw) measurement is maintained at a pre-determined position. But this is also selective as ripples would still continue to be filtered out and demand-side changes would still receive feed-forward compensation. It is also distinct to other prior art where a first measurement (e.g. a gas flow) always receives input from a second measurement (e.g. a pressure) to create a compensated flow with is then the "controlled" variable.

The above Background Art describes, in the context of MR refrigerant inventory control, the difficulties associated with trying to calculate the underlying composition and inventory variables in the mixed refrigeration circuit, which are physically impossible to directly "measure" in this case.

From the above description should be readily apparent that the disclosed system and method may be applied in a general sense to the control of any continuous process and is not limited in application to refrigerant control in a LNG liquefaction plant.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the system and method as disclosed herein.

The invention claimed is:
1. A method of operating a controller of a continuous process, wherein the controller outputs a signal to adjust one or more manipulated variables (MVs), the signal being associated with an effect of one or more disturbances on the process or an associated process stream arising from the process, wherein an adjustment of the one or more MVs affects the process and affects a controlled variable (CV) measured at an output of the process, the CV being indicative of a characteristic of the process or associated process stream arising from the process, the method comprising:
- allowing one or more disturbances to affect the process or process stream arising from the process;
- measuring the CV affected by the one or more disturbances;
- producing a compensated control variable CV' by subtracting at least part of the effect of the one or more disturbances from the measured CV, wherein the effect of the one or more disturbances on the process or associated process stream and on the measured CV is at least partially masked;
- comparing the compensated CV' with a set point to generate a deviation; and
- inputting the deviation into the controller, such that the effect of the one or more disturbances on the process or associated process stream and on the measured CV is at least partially masked from the controller, and the adjustment of the one or more MVs at an output of the controller, in response to the at least partially masked one or more disturbances, is at least partially reduced.

2. The method according to claim 1, further comprising producing the compensated control variable CV' by subtracting the effect of the one or more disturbances to the measured CV, wherein the effect of the one or more disturbances on the process or associated process stream and on the measured CV is fully masked, and wherein the controller makes no change to the one or more MVs in response to the effect of the one or more disturbances on the process or associated process stream.

3. The method according to claim 1, wherein the one or more disturbances comprises one or both of a load on the process, and a variation in the process or process stream arising from modification of the one or more MVs.

4. The method according to claim 1, wherein:
- the process is a refrigerant control process in a mixed refrigerant (MR) loop of a LNG liquefaction plant, the MR loop having a mixed refrigerant compression stage and a MR accumulator through which a mixed refrigerant flows and wherein the mixed refrigerant comprises a mixture of components in liquid phase, vapour phase or both liquid and vapour phases, the components including N2, C1, C2, and C3+; and
- the CV is one of a plurality of CV2 comprising one or a combination of two or more of a first control variable CV1, a second control variable CV2, a third control variable CV3 and a fourth control variable CV4, wherein:
  - (a) the first control variable CV1 a molar percentage of N2 in the MR at a high pressure end of the compression stage,
  - (b) the second control variable CV2 is pressure in the MR accumulator,
  - (c) the third control variable CV3 is a molar ratio C3/C2 at the high pressure end of the compression stage, and
  - (d) the fourth control variable CV4 is liquid level within the MR accumulator.

5. The method according to claim 4, wherein one or more CVs of the plurality of CVs is modified prior to input to the controller to at least partially mask an effect of the one or more disturbances on the process or associated process stream such that the controller at least partially reduces the adjustment of one or more MVs in response to the partially masked one or more disturbances.

6. The method according to claim 5, wherein the one or more disturbances comprises a first disturbance which comprises a change in one of;
- (a) a rate of the process; and
- (b) a change in ambient temperature.

7. The method according to claim 5, wherein the one or more disturbances comprises a first disturbance being a change in a rate of the process and a second disturbance being a change in ambient temperature.

8. The method according to claim 4, wherein the plurality of CVs comprises CV1, CV2 and CV3, and one or more of the control variables CV1-CV3 is compensated to produce corresponding compensated control variables CV1'-CV3' in which compensation is applied to mask the effect on the control variable CV1-CV3 of circulation through the MR loop.

9. The method according to claim 4, wherein the plurality of CVs comprises CV4, and the CV4 is compensated to produce a compensated liquid level control variable CV4', and one or both of CV4 and CV4' are used to provide inputs to the controller.

10. The method according to claim 8, wherein CV1 is compensated to produce CV1', and a first of the one or more MV is a flow rate of an N2-rich stream added to or purged from the mixed refrigerant loop, and the controller is arranged to add or purge an N2-rich stream to or from the mixed refrigerant when CV1' is outside of prescribed limits.

11. The method according to claim 10, wherein CV2 is compensated to produce CV2', and the controller is arranged to add or purge an N2-rich stream to or from the mixed refrigerant loop when CV2' is outside of prescribed limits.

12. The method according to claim 8, wherein CV2 is compensated to produce CV2', CV3 is compensated to produce CV3', and a first of the one or more MVs is either one of:
- (a) a flow rate of an N2-rich stream added to or purged from the mixed refrigerant loop and wherein the controller is arranged to purge or add an N2 rich stream to the mixed refrigerant when CV2' is outside of prescribed limits;
- (b) a flow rate of a C1 rich stream added to or purged from the mixed refrigerant loop and wherein the controller is arranged to purge or add the C1 rich stream to or from the mixed refrigerant loop when CV2' is outside of prescribed limits; or
- (c) a flow rate of a C2 rich stream added to or purged from the mixed refrigerant loop and wherein the controller is arranged to purge or add the C2 rich stream to the mixed refrigerant when CV3' is outside of prescribed limits.

13. The method according to claim 8, wherein CV2 is compensated to produce CV2', CV3 is compensated to produce CV3', and a first and a second of the one or more MVs comprises any two of:
- (a) a flow rate of an N2-rich stream added to or purged from the mixed refrigerant loop and wherein the controller is arranged to purge or add an N2 rich stream to the mixed refrigerant when CV2' is outside of prescribed limits;
- (b) a flow rate of a C1 rich stream added to or purged from the mixed refrigerant loop and wherein the controller is arranged to purge or add the C1 rich stream to or from the mixed refrigerant loop when CV2' is outside of prescribed limits; and (c) a flow rate of a C2 rich stream added to or purged from the mixed refrigerant loop and wherein the controller is arranged to purge or add the C2 rich stream to the mixed refrigerant when CV3' is outside of prescribed limits.

14. The method according to claim 8, wherein CV2 is compensated to produce CV2', CV3 is compensated to produce CV3', and:
   (a) a first of the one or more MVs is a flow rate of an N2-rich stream added to or purged from the mixed refrigerant loop and wherein the controller is arranged to purge or add an N2 rich stream to the mixed refrigerant when CV2' is outside of prescribed limits;
   (b) a second of the one or more MVs is a flow rate of a C1 rich stream added to or purged from the mixed refrigerant loop and wherein the controller is arranged to purge or add the C1 rich stream to or from the mixed refrigerant loop when CV2' is outside of prescribed limits; and
   (c) a third of the one or more MVs is a flow rate of a C2 rich stream added to or purged from the mixed refrigerant loop and wherein the controller is arranged to purge or add the C2 rich stream to the mixed refrigerant when CV3' is outside of prescribed limits.

15. The method according to claim 9, wherein the controller is arranged to add or purge the C2 rich stream to or from the mixed refrigerant when CV4' is outside of prescribed limits.

16. The method according to claim 9, wherein one of the one or more MVs is a flow rate of a C2 rich stream added to or purged from the mixed refrigerant loop, and the controller is arranged to purge or add C2 to the mixed refrigerant when CV4' is outside of prescribed limits.

17. The method according to claim 9, wherein CV3 is compensated to produce CV3', one of the one or more MVs is a flow rate of a C3 rich stream added to or purged from the mixed refrigerant loop, and the controller is arranged to purge or add the C3 rich stream to the mixed refrigerant when CV3' is outside of prescribed limits.

18. The method according to claim 17, wherein the controller is arranged to add or purge the C3 rich stream to or from the mixed refrigerant when CV4' is outside of prescribed limits.

19. The method according to claim 14, wherein CV4 is compensated to produce CV4', a fourth of the one or more MVs is a flow rate of a C3 rich steam added to or purged from the mixed refrigerant loop, and the controller is arranged to purge or add the C2 rich stream to or from the mixed refrigerant when CV4' is outside of prescribed limits.

20. The method according to claim 19, wherein a fifth of the one or more MVs is a flow rate of a C3 rich steam added to or purged from the mixed refrigerant loop, and the controller is arranged to purge or add C3 to the mixed refrigerant when CV4' is outside of prescribed limits.

21. The method according to claim 5, wherein the modifying of the one or more CV prior to input to the controller is applied to some but not all of the one or more disturbances.

* * * * *